US006660423B2

(12) United States Patent
Neutzler et al.

(10) Patent No.: US 6,660,423 B2
(45) Date of Patent: *Dec. 9, 2003

(54) DIRECT METHANOL FUEL CELL INCLUDING A WATER MANAGEMENT SYSTEM AND METHOD OF FABRICATION

(75) Inventors: Jay Neutzler, Santa Fe, NM (US); Joseph W. Bostaph, Chandler, AZ (US); Allison M. Fisher, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 128 days.

This patent is subject to a terminal disclaimer.

(21) Appl. No.: 09/738,131

(22) Filed: Dec. 15, 2000

(65) Prior Publication Data

US 2002/0076599 A1 Jun. 20, 2002

(51) Int. Cl.$^7$ .......................... H01M 8/02; H01M 8/04; H01M 8/10; H01M 4/86

(52) U.S. Cl. ........................ 429/38; 429/32; 429/34; 429/40; 429/44; 427/115

(58) Field of Search ........................ 429/30, 32, 34, 429/38, 39, 40, 44; 29/623.1; 427/115

(56) References Cited

U.S. PATENT DOCUMENTS

| | | | | |
|---|---|---|---|---|
| 3,392,058 A | * | 7/1968 | Harrison et al. | |
| 4,876,162 A | * | 10/1989 | McElroy James F. | 429/13 |
| 5,432,023 A | * | 7/1995 | Yamada et al. | |
| 5,952,119 A | * | 9/1999 | Wilson | 429/34 |
| 6,387,559 B1 | * | 5/2002 | Koripella et al. | 429/22 |
| 6,465,119 B1 | * | 10/2002 | Koripella et al. | 429/32 |
| 6,497,975 B2 | * | 12/2002 | Bostaph et al. | 429/38 |
| 2003/0031908 A1 | * | 2/2003 | Bostaph et al. | 429/30 |
| 2003/0031913 A1 | * | 2/2003 | Pavio et al. | 429/34 |

FOREIGN PATENT DOCUMENTS

| | | | |
|---|---|---|---|
| JP | 63110555 | * | 5/1988 |
| WO | WO 9927590 | * | 6/1999 |

OTHER PUBLICATIONS

Kelley et al., "A miniature methanol/air polymer electrolyte fuel cell," Electrochemical and solid–state letters 3, (2000), pp. 407–409. (no month).

Cacciola et al., "Technology up date and new strategies on fuel cells," Journal of power sources 100 (2001), pp. 67–79, (no month).

Maynard et al., "Miniature fuel cells for portable power: design considerations and challenges," J. Vac. Sci. Technol. B 20(4), Jul./Aug. 2002, pp. 1287–1297.

Hockaday et al., "A better power supply for portable electronics: microfuel cells," Energy Related Devices, Inc. pp. 1–5, Oct. 2000.

* cited by examiner

Primary Examiner—Randy Gulakowski
Assistant Examiner—Jonathan Crepean
(74) Attorney, Agent, or Firm—William E. Koch

(57) ABSTRACT

A fuel cell device and method of forming the fuel cell device including a base portion, formed of a singular body, and having a major surface. At least one fuel cell membrane electrode assembly including a plurality of hydrophilic threads for the wicking of reaction water is formed on the major surface of the base portion. A fluid supply channel including a mixing chamber is defined in the base portion and communicating with the fuel cell membrane electrode assembly for supplying a fuel-bearing fluid to the membrane electrode assembly. An exhaust channel including a water recovery and recirculation channel is defined in the base portion and communicating with the membrane electrode assembly and the plurality of hydrophilic threads. The membrane electrode assembly and the cooperating fluid supply channel and cooperating exhaust channel forming a single fuel cell assembly.

18 Claims, 3 Drawing Sheets

DIRECT METHANOL FUEL CELL INCLUDING A WATER MANAGEMENT SYSTEM AND METHOD OF FABRICATION

FIELD OF INVENTION

The present invention pertains to fuel cells, and more particularly to a direct methanol fuel cell including a water management system and a method of fabricating the system, in which water is collected and redistributed during the process of generating electrical energy.

BACKGROUND OF THE INVENTION

Fuel cells in general, are "battery replacements", and like batteries, produce electricity through an electrochemical process without combustion. The electrochemical process utilized provides for the combining of protons with oxygen from air or as a pure gas. The process is accomplished utilizing a proton exchange membrane (PEM) sandwiched between two electrodes, namely an anode and a cathode. Fuel cells, as known, are a perpetual provider of electricity. Hydrogen is typically used as the fuel for producing the electricity and can be processed from methanol, natural gas, petroleum, or stored as pure hydrogen. Direct methanol fuel cells (DMFCs) utilize methanol, in a gaseous or liquid form as fuel, thus eliminating the need for expensive reforming operations. DMFCs provide for a simpler PEM cell system, lower weight, streamlined production, and thus lower costs.

In a standard DMFC, a dilute aqueous solution of methanol is fed as the fuel on the anode side (first electrode), and the cathode side (second electrode) is exposed to forced or ambient air (or O2). A Nafion® type proton conducting membrane typically separates the anode and the cathode sides. Several of these fuel cells can be connected in series or parallel depending on power requirements.

Typically, DMFC designs are large stacks with forced airflow at elevated temperatures. Smaller air breathing DMFC designs are more complicated. In conventional PEM fuel cells, stack connections are made between the fuels cell assemblies with conductive plates, machined with channels or grooves for gas distribution. A typical conventional fuel cell is comprised of an anode ($H_2$ or methanol side) current collector, anode backing, membrane electrode assembly (MEA) (anode/ion conducting membrane/cathode), cathode backing, and cathode current collector. Each fuel cell is capable of producing approx. 1.0 V. To obtain higher voltages, fuel cells are typically stacked in series (bi-polar manner—positive to negative) one on top of another. Conventional fuel cells can also be stacked in parallel (positive to positive) to obtain higher power, but generally larger fuel cells are simply used instead.

During operation of a direct methanol fuel cell, a dilute aqueous methanol (usually 3–4% methanol) solution is used as the fuel on the anode side. If the methanol concentration is too high, then there is a methanol crossover problem that will reduce the efficiency of the fuel cell. If the methanol concentration is too low then there will not be enough fuel on the anode side for the fuel cell reaction to take place. Current DMFC designs are for larger stacks with forced airflow. The smaller air breathing DMFC designs are difficult to accomplish because of the complexity in miniaturizing the system for portable applications. Carrying the fuel in the form of a very dilute methanol mixture would require carrying a large quantity of fuel which is not practical for the design of a miniature power source for portable applications. Miniaturizing the DMFC system requires having on hand separate sources of methanol and water and mixing them in-situ for the fuel cell reaction. To aid in supplying methanol and water to the anode, it would be beneficial to recirculate the aqueous fuel mixture after the fuel cell reaction, and recycle the water generated at the cathode in the fuel cell reaction, as well as the water arriving at the cathode via diffusion and electro-osmotic drag.

Accordingly, it is a purpose of the present invention to provide for a direct methanol fuel cell system design in which a water management system is integrated into a miniaturized device.

It is a purpose of the present invention to provide for a direct methanol fuel cell including a water management system, comprised of microchannels, cavities, hydrophobic treatments, and microfluidics technology for fuel-bearing fluid mixing, pumping and recirculation of water by-product production.

It is still a further purpose of the present invention to provide for a direct methanol fuel cell including a water management system in which all of the system components are embedded inside a base portion, such as a ceramic base portion.

It is yet a further purpose of the present invention to provide for method of fabricating a direct methanol fuel cell including a water management system, comprised of microchannels, cavities, chemical surface modifications, and microfluidics technology for fuel-bearing fluid mixing, pumping and recirculation of water by-product production.

SUMMARY OF THE INVENTION

The above problems and others are at least partially solved and the above purposes and others are realized in a fuel cell device and method of forming the fuel cell device including a base portion, formed of a singular body, and having a major surface. At least one membrane electrode assembly is formed on the major surface of the base portion. The membrane electrode assembly includes hydrophilic properties for the water management of by-product water. A fluid supply channel is defined in the base portion and communicates with the at least one membrane electrode assembly for supplying a fuel-bearing fluid to the at least one membrane electrode assembly. An exhaust channel is defined in the base portion and communicating with the at least one membrane electrode assembly. The exhaust channel is spaced apart from the fluid supply channel for exhausting by-product fluid, including water, from the at least one membrane electrode assembly. The membrane electrode assembly and the cooperating fluid supply channel and cooperating exhaust channel form a single fuel cell assembly.

BRIEF DESCRIPTION OF THE DRAWINGS

Referring to the drawings.

DESCRIPTION OF THE PREFERRED EMBODIMENT

Water management is critical for all polymer electrolyte membrane (PEM) fuel cells. The importance of keeping the reaction surface from forming a water barrier layer, or flooding, thus reducing reaction kinetics, is critical. It is also critical to keep the membrane well hydrated for high conductivity. Liquid water production is pressure, temperature, and current dependant. In the prior art, liquid water removal is largely done through temperature gradient (2-phase), hydrophobic treatments, micro/macro porous diffusion backings, and convective flow. It is disclosed in the present invention to provide for water management of a fuel cell device that includes a means for water management including a hydrophilic material, more particularly hydrophilic threads to evenly hydrate the membrane, as well as remove/redirect liquid water accumulation from the cathode side of the fuel cell device. After accumulation, the water is fed back to the anode side of the fuel cell device for reaction and dilution of the methanol stream.

Figure 1:
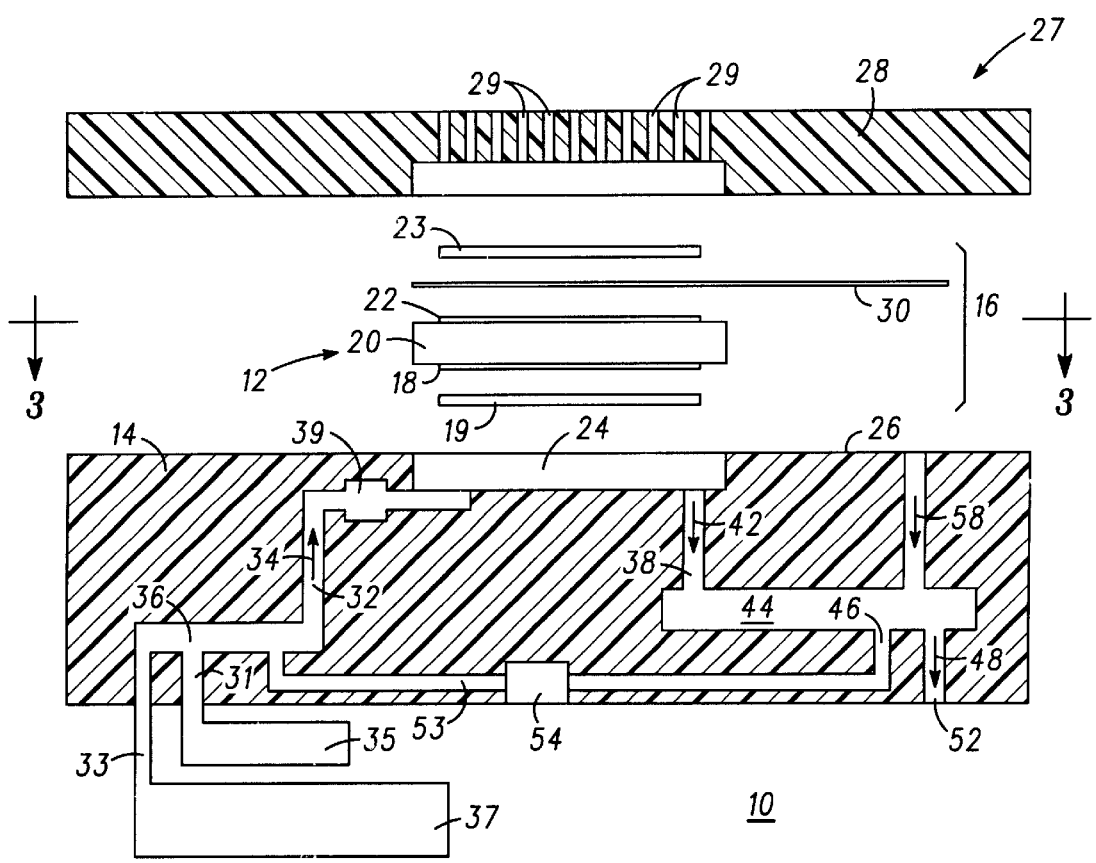
FIG. 1 is a simplified sectional view of a direct methanol fuel cell device including a water management system formed on a single base portion including a plurality of microfluidic channels, according to the present invention.

Turning now to the drawings, FIG. 1 illustrates in simplified sectional view a direct methanol fuel cell including a water management system fabricated according to the present invention. Illustrated is a fuel cell system, generally referenced 10, including a single fuel cell assembly 12. Fuel cell 12 is formed on a base portion. Base portion 14 is designed to be impermeable to the mixture of fuel and oxidizer materials that is utilized to power fuel cell 12. Typically a hydrogen-containing fuel/oxidizer mixture is utilized to power fuel cell 12. Suitable fuels that are consumed by fuel cell 12 to produce electrical energy are hydrogen-containing materials such as hydrogen, methane and methanol. In this particular example, methanol is used to fuel cell 12. Base portion 14 is typically formed of glass, plastic, silicon, graphite, ceramic, or any other suitable material. In this particular embodiment, planar stack 10 is composed of a single direct methanol fuel cell 12 defined by a fuel cell membrane electrode assembly (MEA) (discussed presently).

Base portion 14 has formed within a plurality of microfluidic channels as illustrated. More particularly, base portion 14 has formed a first fluid inlet 33 and a second fluid inlet 31, in fluidic communication with a fluid supply channel 32. Fluid supply channel 32 is formed in base portion 14 utilizing standard techniques, well known in the art, such as multi-layer ceramic technology, micromachining, or injection molding. Fluid supply channel 32 supplies a fuel-bearing fluid 34 to fuel cell 12. In this particular example, fuel-bearing fluid 34 is comprised of methanol and water being delivered directly from a methanol tank 35 and a water tank 37. A mixing chamber 36 is formed in base portion 14 in micro-fluidic communication with fluid supply channel 32 as illustrated. In a preferred embodiment, fuel-bearing fluid 34 is preferably 0.5%–4.0% methanol in water (99.5%–96.0%). The goal is to pump methanol into the overall assembly 10 at a rate of approximately 0.002 ml/min and pump the water into the assembly 10 at a rate of approximately 0.098 ml/min (2% to 98%). The fuel cell assembly 10 would also be able to use other fuels, such as hydrogen or ethanol, but it should be noted that ethanol is not as efficient, nor does it produce as much power as does the use of methanol. In this particular example a separate methanol tank 35 and water tank 37 are utilized to supply the fuel-bearing fluid 34. The methanol will be pumped in at a given rate, and the water will be added as needed determined by the efficiency of the integrated water management system (discussed presently), which is monitored by a methanol concentration sensor 39. Methanol concentration sensor 39 helps maintain the methanol ratio in the mixture. The methanol and water will be homogeneously mixed in mixing chamber 36 before flowing to fuel cell 12.

In addition, there is formed in base portion 14, an exhaust channel 38 communicating with fuel cell 12. Exhaust channel 38 serves to remove exhaust products 42 from fuel cell 12, namely carbon dioxide and a water/methanol mixture. During operation, exhaust products are separated in a carbon dioxide separation chamber 44 into the water/methanol mixture 46 and a carbon dioxide gas 48. Next, gas 48 is expelled through an exhaust outlet 52, such as a gas permeable membrane and water/methanol mixture 46 is recirculated through a recirculating channel 53, having included as a part thereof a pump 54, such as a MEMs-type pump, or check valve type assembly, back to mixing chamber 36. In addition, in microfluidic communication is a water management system (discussed presently) and a water recovery return channel 58. The water management system serves to recapture water from the cathode side of fuel cell 12, and direct it toward water recovery return channel 58, as illustrated. Water recovery return channel 58 is in micro-fluidic communication with separation chamber 44 and ultimately mixing chamber 36.

Management and recirculation of the water/methanol mixture, subsequent to reaction in fuel cell 12, and the recycling of the water diffused across the cathode, is required for miniaturizing the system. It is anticipated that the fuel delivery system includes methanol and water, in the form of methanol tank 35 and water tank 37, which is to be carried in portable disposable cartridge-like devices, connected through tubing to the base portion 14.

Fuel cell 12 is comprised of a fuel cell membrane electrode assembly 16 comprised of first electrode 18, or anode, including a carbon cloth backing 19, a film 20, such as a protonically conducting electrolyte membrane, and a second electrode 22, or cathode, including a carbon cloth backing 23. First and second electrodes 18 and 22 are comprised of a material selected from the group consisting of platinum, palladium, gold, nickel, tungsten carbide, ruthenium, molybdenum, and alloys of platinum, palladium, gold, nickel, tungsten carbide, molybdenum, and ruthenium. Film 20 is further described as formed of a Nafion® type material that prevents the permeation of fuel from the anode side (first electrode 18) to the cathode side (second electrode 22) of fuel cell 12.

Membrane electrode assembly 16 in this particular example is positioned in a recess 24 formed in an uppermost major surface 26 of a base portion 14. It is anticipated by this disclosure that membrane electrode assembly 16 can be positioned on major surface 26 of base portion 14 without the need for the formation of recess 24. In this instance, a spacer (not shown) would be utilized to avoid complete compression of membrane electrode assembly 16.

Planar stack array 10 further includes a top portion, more specifically, in this particular embodiment, a current collector 28, including a plurality of air flow-throughs 29 positioned to overlay membrane electrode assembly 16. Current collector 28 is formed as part of a cap portion, generally referenced 27. Cap portion 27 provides for the exposure of second electrode 22 to ambient air.

During fabrication, fuel cell membrane electrode assembly 16 is formed using a hot press method, or other standard method known in the art. More particularly, first electrode 18 is formed or positioned in contact with base portion 14. Various materials are suitable for the formation of electrode 18. Suitable materials include platinum, palladium, gold, nickel, tungsten carbide, ruthenium, molybdenum and various alloys of these materials.

In this specific embodiment, and for exemplary purposes, first electrode 18 has a dimension of approximately 2.0 cm×2.0 cm. When planar stack 10 includes a plurality of fuel cells 12, such as that described with respect to FIG. 2 below, there is included a separation of approximately 0.5 mm to 1 mm between adjacent fuel cells 12. It should be understood that dependent upon the required power output, any number of fuel cells 12 and any measurement of distance between fuel cells 12, can be fabricated to form a planar array of fuel cells, from one single fuel cell, to numerous fuel cells.

Film 20, formed of a protonically conducting electrolyte, also referred to as a proton exchange membrane (PEM), is comprised of a Nafion® type material. Film 20 as previously stated serves to limit the permeation of fuel from the anode 18 of fuel cell 12 to the cathode 22 of fuel cell 12.

Next, during fabrication of membrane electrode assembly 16, a second electrode 22 is formed to be correspondingly cooperating with first electrode 18. Second electrode 22 is formed having approximately the same dimension as its corresponding first electrode 18. It should be understood, that as described, fuel cell membrane electrode assembly 16 is comprised of first electrode 18, film 20, second electrode 22, and gas diffusion media layers, or more particularly carbon cloth backing layers, 19 and 23.

Positioned on an uppermost surface of second electrode 22, therefore sandwiched between second electrode 22 and carbon cloth backing 23, are a plurality of hydrophilic threads 30. Hydrophilic threads 30 are preferably located between electrode 22 and carbon cloth backing 23 to provide for even hydration of fuel cell membrane electrode assembly 16, and more particularly film 20. Hydrophobic threads 30 are disclosed in this embodiment as comprised of a polyester fiber material, but it should be understood that additional hydrophilic fibers are anticipated by this disclosure. The hydrophobicity of carbon backing layer 23 provides for hydrostatic pressure to "push" the water along hydrophilic threads 30. Subsequent to accumulation of the water in hydrophilic threads 30, the water is fed back to the anode side of fuel cell 12 through water recovery return channel 58 for reaction and dilution of the methanol stream. Hydrophilic threads 30 are positioned parallel to flow channels (not shown) between second electrode 22 (cathode electrode) and carbon backing layer 23, or gas diffusion backing layer. Hydrophilic threads 30 provide for the wicking away of water prior to its reaching carbon backing layer 23.

Finally, current collector 28 is positioned relative to second electrode 22. Current collector 28 is formed at least 0.1 mm thick and of a length dependent upon a point of contact on fuel cell 12. In the alternative, when the device includes a plurality of fuel cells 12, the plurality of fuel cells 12 can be electrically interfaced using silver conducting paint deposited by evaporation or sputtering. Materials suitable for this are gold (Au), silver (Au), copper (Cu), or any other low electrical resistant material. The bulk resistivity of the electrode material and area of the electrode will dictate the type of current collection scheme to minimize ohmic losses. It should be understood, that it is anticipated that fuel cell 12 can be electrically interfaced with additional fuel cells (not shown) utilizing either a series connection or a parallel connection, dependent upon the desired resultant voltage. To achieve electrical interfacing (not shown) of a plurality of fuel cells 12, each of the second electrodes 22 would be electrically connected to an adjacent first electrode 18, thus connected in series electrical interface, to increase the output voltage, each of the first electrodes 18 would be electrically connected to an adjacent first electrode 18, and each of the second electrodes 22 would be electrically connected to an adjacent second electrode 22, thus connected in parallel electrical interface.

Figure 2:
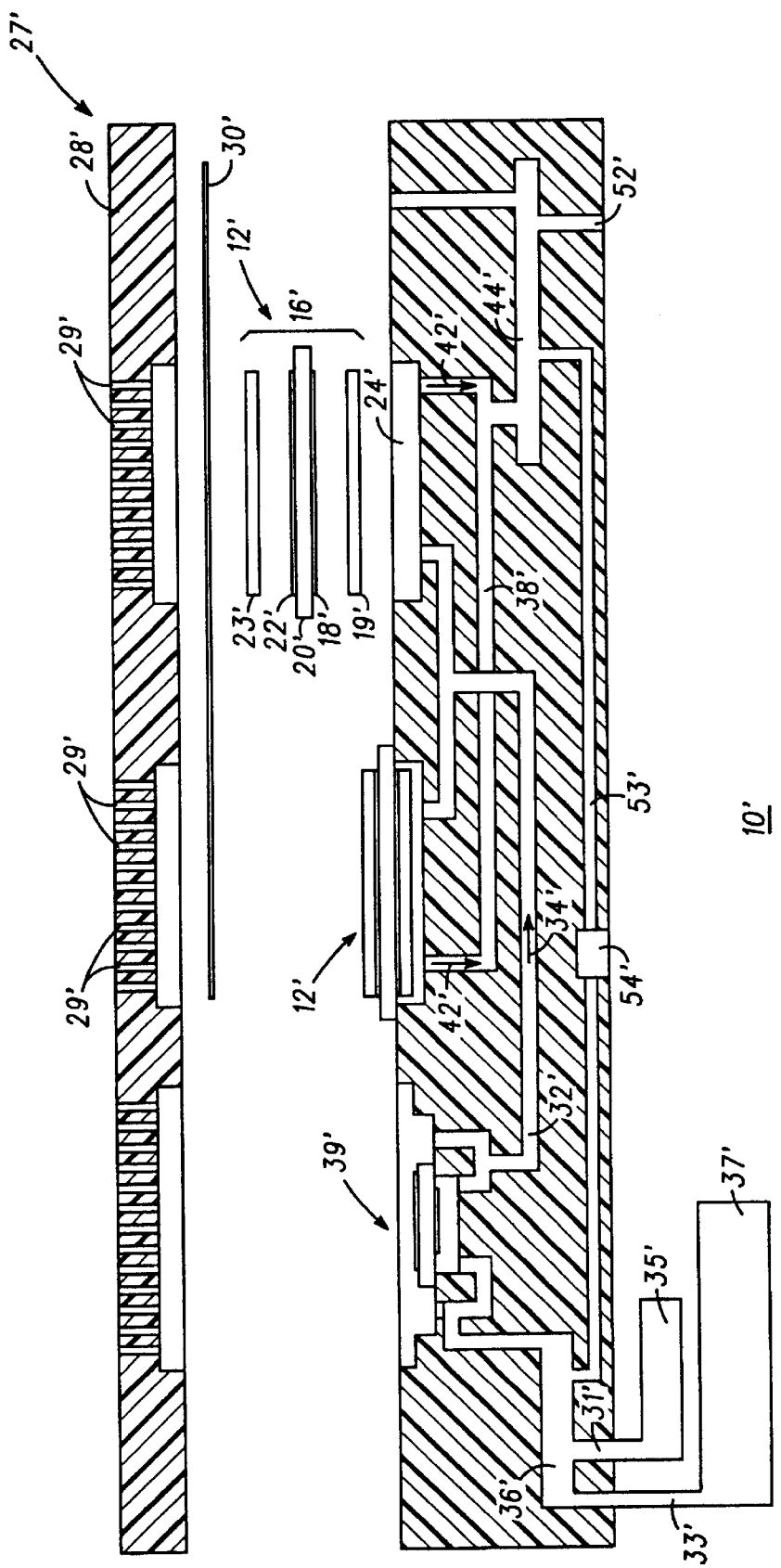
FIG. 2 is a simplified sectional view of a plurality of direct methanol fuel cell devices including a water management system formed on a single base portion including a plurality of microfluidic channels, according to the present invention.

Referring now to FIG. 2, illustrated is a fuel cell array, generally referenced 10'. It should be noted that all components of the first embodiment as illustrated in FIG. 1, that are similar to components of this particular embodiment as illustrated in FIG. 2, are designated with similar numbers, having a prime added to indicate the different embodiment. Fuel cell array 10' has formed as a part thereof, four individual fuel cells 12', having an overall base portion 14' dimension of approximately 5.5 cm×5.5 cm×0.5 cm, and individual fuel cell 12' area of 4×1.5–2.0 cm squares. Each individual fuel cell 12' is capable of generating approximately 0.5V and 22.5 mA/cm$^2$ of power. Fuel cells 12' are formed on a base portion 14', each fuel cell 12' being spaced at least 1 mm apart from an adjacent fuel cell 12'. It should be understood that dependent upon the required power output, any number of fuel cells 12' can be fabricated to form a planar array of fuel cells, from one fuel cell as illustrated in FIG. 1, to numerous fuel cells.

Similar to fuel cell system 10, described with respect to FIG. 1, fuel cell system 10' includes a base portion 14', designed to be impermeable to the mixture of fuel and oxidizer materials that is utilized to power fuel cells 12'. As previously stated, a hydrogen-containing fuel/oxidizer mixture is utilized to power fuel cells 12'. Similar to FIG. 1, in this particular embodiment, methanol is used to fuel, cells 12'. Base portion 14' is formed of glass, plastic, silicon, ceramic, or any other suitable material. Planar stack 10' is composed of a plurality of direct methanol fuel cells 12', each defined by a fuel cell membrane electrode assembly (MEA) (discussed presently).

Base portion 14' has formed within a plurality of microfluidic channels as illustrated. More particularly, base portion 14' has formed a first fluid inlet 33' and a second fluid inlet 31', in fluidic communication with a fluid supply channel 32'. Fluid supply channel 32' equally supplies a fuel-bearing fluid 34' to fuel cells 12'. In this particular example, fuel-bearing fluid 34' is comprised of methanol and water being delivered directly from a methanol tank 35', a water tank 37' and a recirculating channel 53'. A mixing chamber 36' is formed in base portion 14' in micro-fluidic communication with fluid supply channel 32' as illustrated. In a preferred embodiment, fuel-bearing fluid 34' is 0.5%–4.0% methanol in water (99.5%–96.0%). Similar to FIG. 1, in this particular example a separate methanol tank 35' and water tank 37' are utilized to supply the fuel-bearing fluid 34'. The methanol will be pumped in at a given rate, and the water will be added as needed determined by the efficiency of the integrated water management system (discussed presently), which is monitored by a methanol concentration sensor 39'. Methanol concentration sensor 39' helps maintain the methanol ratio in the mixture. The methanol and water will be homogeneously mixed in mixing chamber 36' before flowing to fuel cells 12'.

In addition, there is formed in base portion 14', an exhaust channel 38' communicating with fuel cells 12'. Exhaust channel 38' serves to remove exhaust products 42' from fuel cell 12', namely carbon dioxide and a water/methanol mixture. During operation, exhaust products are separated in a carbon dioxide separation chamber 44' into the water/methanol mixture 46' and a carbon dioxide gas 48'. Next, gas 48' is expelled through an exhaust outlet 52', such as a gas permeable membrane and water/methanol mixture 46' is recirculated through a recirculating channel 53', having included as a part thereof a pump 54', such as a MEMs-type pump, or check valve type assembly, back to mixing chamber 36'. In addition, in microfluidic communication is a water management system (discussed presently) and a water recovery return channel 58'. Water management system serves to recapture water from the cathode side of fuel cells 12', and direct it toward water recovery return channel 58', as illustrated. Water recovery return channel 58' is in microfluidic communication with separation chamber 44' and ultimately mixing chamber 36'.

Management and recirculation of the water/methanol mixture, subsequent to reaction in fuel cells 12', and the recycling of the water diffused across the cathode, is required for miniaturizing the system. As previously stated, it is anticipated that the fuel delivery system includes methanol and water, in the form of methanol tank 35' and water tank 37'.

Fuel cells 12' are each comprised of a fuel cell membrane electrode assembly 16' comprised of first electrode 18', including a carbon cloth backing 19', a film 20', such as a porous protonically conducting electrolyte membrane, and a second electrode 22', including a carbon cloth backing 23'. First and second electrodes 18' and 22' are formed similar to electrodes 18 and 22 described with reference to FIG. 1. Film 20' is further described as formed of a Nafion® type material that prevents the permeation of fuel from the anode side (first electrode 18') to the cathode side (second electrode 22') of fuel cells 12'.

Membrane electrode assemblies 16' in this particular example are positioned in a plurality of recesses 24' formed in an uppermost major surface 26' of a base portion 14'. It is anticipated by this disclosure that membrane electrode assemblies 16' can be positioned on major surface 26' of base portion 14' without the need for the formation of recesses 24'. Planar stack array 10' further includes a top portion, more specifically, in this particular embodiment, a current collector 28' positioned to overlay membrane electrode assembly 16'.

During fabrication, fuel cell membrane electrode assemblies 16' are formed using a hot press method, or other standard method known in the art. More particularly, first electrode 18' is formed or positioned in contact with base portion 14'. Various materials are suitable for the formation of electrode 18'.

In this specific embodiment, and for exemplary purposes, first electrode 18' has a dimension of approximately 2.0 cm×2.0 cm. Fuel cells 12' are formed to include approximately 0.5 mm to 1 mm between adjacent fuel cells 12'.

Next, during fabrication of membrane electrode assembly 16', a second electrode 22' is formed to be correspondingly cooperating with first electrode 18'. Second electrode 22' is formed having approximately the same dimension as its corresponding first electrode 18'

Positioned on an uppermost surface of carbon cloth backing 23' are a plurality of hydrophilic threads 30'. Hydrophilic threads 30' are in this particular embodiment located on an uppermost surface of carbon cloth backing 23' to provide for even hydration of fuel cell membrane electrode assembly 16'. As illustrated, hydrophilic threads 30' extend so as to cover the plurality of fuel cells 12'. It should be understood that anticipated by this disclosure is the formation of hydrophilic threads 30' to extend only for the purpose of water management as to each individual fuel cell device 12'. The hydrophobicity of carbon backing layer 23' provides for hydrostatic pressure to "push" the water along hydrophilic threads 30'. Subsequent to accumulation of the water in hydrophilic threads 30', the water is fed back to the anode side of fuel cells 12' through water recovery return channel 58' for reaction and dilution of the methanol stream. Hydrophilic threads 30' are positioned parallel to flow channels (not shown) on an uppermost surface of carbon backing layer 23', or gas diffusion backing layer. Hydrophilic threads 30' provide for the wicking away of water prior to its reaching a current collector 28'(discussed presently).

Finally, current collector 28' is positioned relative to second electrode 22'. Current collector 28' is formed at least 0.1 mm thick and of a length dependent upon a point of contact on fuel cells 12'. In the alternative, fuel cells 12' can be electrically interfaced using silver conducting paint deposited by evaporation or sputtering. Materials suitable for this are gold (Au), silver (Au), copper (Cu), or any other low electrical resistant material. The bulk resistivity of the electrode material and area of the electrode will dictate the type of current collection scheme to minimize ohmic losses. In addition, anticipated by this disclosure to achieve electrical interface between fuel cells 12', are patterned conductive epoxy and pressing, wire bonding, tab bonding, spring contacts, flex tape, or alligator clips.

Figure 3:
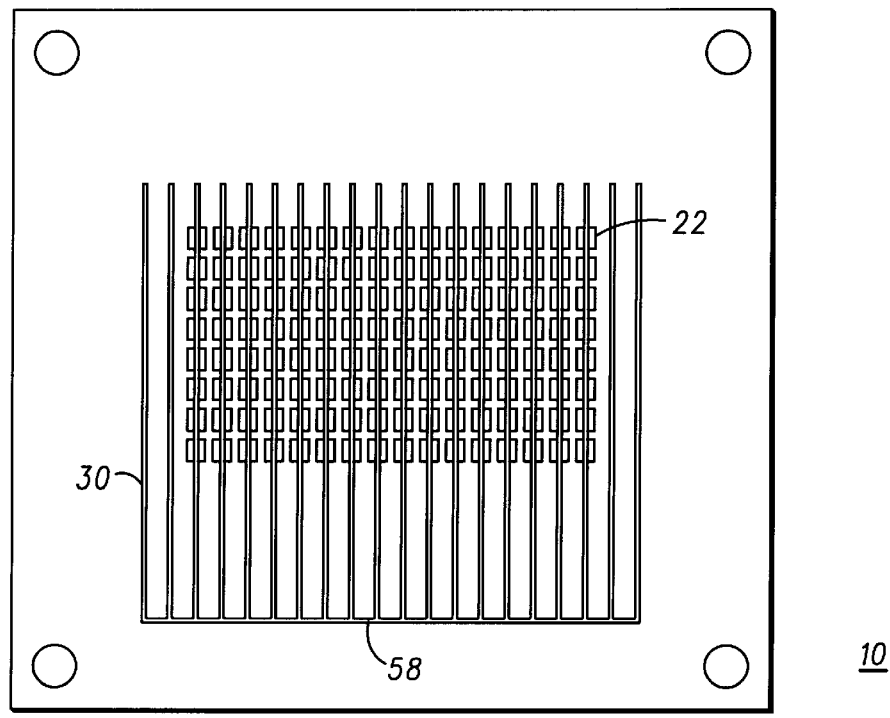
FIG. 3 is a simplified sectional top view taken across line 3—3 of FIG. 1, illustrating the direct methanol fuel device and the plurality of hydrophilic threads according to the present invention.

Referring now to FIG. 3, illustrated is a simplified top sectional view of the fuel cell device of the present invention taken through line 3—3 of FIG. 1. Illustrated are a plurality of spaced apart hydrophilic threads 30. Hydrophilic threads 30 are spaced substantially parallel one from another on an uppermost surface of second electrode 22. As illustrated hydrophilic threads 30 connect to allow for wicking of reaction water through water recovery return channel 58. It should be understood that where a plurality of fuel cell devices 12 are integrated, such as described in FIG. 2, that hydrophilic threads 30 can be positioned to allow for wicking of reaction water to a water recovery channel 58 for each individually formed fuel cell device 12, or for the wicking of reaction water from all the fuel cell devices into a single water recovery channel 58. In addition, it is anticipated by this disclosure that hydrophilic threads 30 can be positioned in any numerous layouts on the surface of electrode 22 that would provide for the wicking of reaction water on the cathode side of assembly 16.

Figure 4:
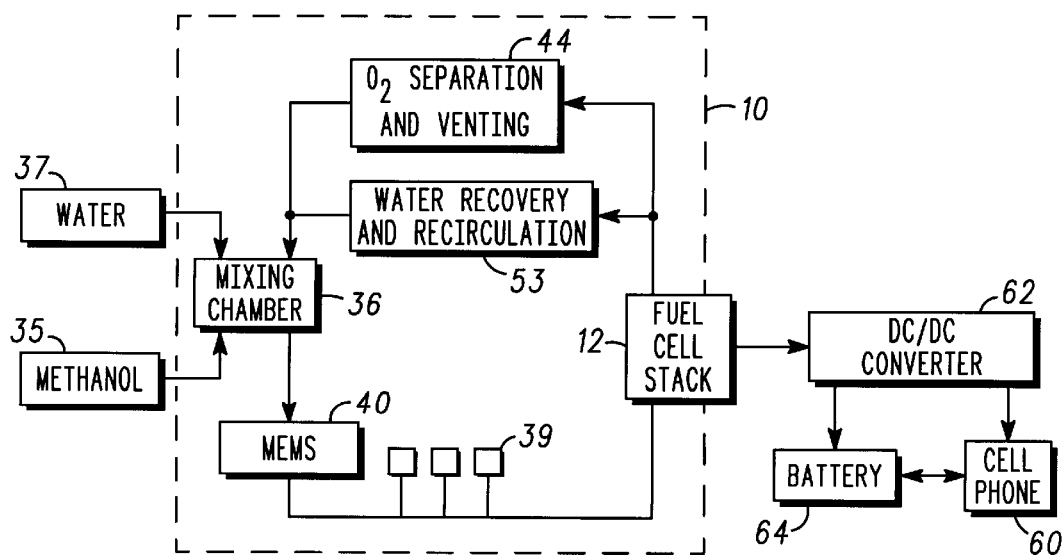
FIG. 4 is a simplified schematic diagram illustrating the fuel cell device including a water management system of the present invention.

Referring now to FIG. 4, illustrated is a simplified schematic diagram detailing the system of the present invention. Illustrated are methanol tank 35 and water tank 37 in microfluidic communication with mixing chamber 36. Mixing chamber 36 as previously discussed serves to achieve the proper ratio of methanol to water. Once properly mixed, the fuel-bearing fluid flows through the fluid supply channel toward the fuel cell 12. An optional MEMs-type pump 40 is utilized to assist with this flow. Concentration sensors 39 are provided to assist with monitoring the methanol concentration, and the temperature of the fuel-bearing fluid. The fuel-bearing fluid next reaches fuel cell stack 12 and generates power. The power is supplied to a DC-DC converter 62 which converts the generated voltage to a useable voltage for powering a portable electronic device, such as a cell phone 60 and included as a part thereof a rechargeable battery 64. During operation spent fluid is exhausted through the exhaust channel toward a carbon dioxide separation chamber and carbon dioxide vent, generally referenced 44.

In addition, water is recovered from the cathode side of the fuel cell 12 by hydrophilic threads 30, and from the separation chamber 44 and is recirculated through a recirculating channel back to the mixing chamber 36. This recirculating of fluid provides for the consumption of less water from water tank 37 and thus less replenishment of water tank 37.

Accordingly, disclosed is a fuel cell system including a water management system and method of fabrication which provides for the fabrication of the system, providing for inclusion of a single fuel cell or a plurality of fuel cells to be formed on a planar surface, thus allowing higher voltages and currents to be gained on a single planar surface. More particularly, the design provides for a simplified system in which spent fuel is collected by hydrophilic threads and recirculated, thereby providing for less consumption and replenishment of a water supply. In addition, it is disclosed that the system of the present invention is a semi-self contained system, and is not orientation sensitive, thus providing for ease in moving the system, such as when providing power to a portable electronic device.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A fuel cell device comprising:
    a base portion, formed of a singular body, and having a major surface;
    at least one fuel cell membrane electrode assembly formed on the major surface of the bass portion, the at least one fuel cell membrane electrode assembly including a first electrode, a film adjacent the first electrode, formed of a protonically conductive electrolyte, a second electrode in contact with the film and a plurality of hydrophilic threads positioned to absorb reaction water at the second electrode;
    a fluid supply channel defined in the base portion and communicating with the at least one fuel cell membrane electrode assembly, the fluid supply channel including a mixing chamber and at least one fuel-bearing fluid inlet;
    an exhaust channel defined in the base portion and communicating with the at least one fuel cell membrane electrode assembly, the exhaust channel including a water recovery and recirculation channel in communication with the plurality of hydrophilic threads, wherein the water recovery and recirculation channel provides for the recovery and recirculation from the fuel cell back to the mixing chamber, a spent water and ethanol mixture and reaction water collected from the plurality of hydrophilic threads, the exhaust channel spaced apart from the fluid supply channel for exhausting fluid from the at least one fuel cell membrane electrode assembly, the at least one fuel cell membrane electrode assembly and the cooperating fluid supply channel and cooperating exhaust channel forming a single fuel cell assembly;
    a plurality of electrical components formed in the base portion for electrical integration of the fuel cell assembly.

2. A fuel cell device as claimed in claim 1 wherein the base portion comprises a material selected from the group consisting of ceramic, plastic, glass, and silicon.

3. A fuel cell device as claimed in claim 2 further wherein the at least one fuel cell membrane electrode assembly formed on the major surface of the base portion includes a plurality of fuel cell membrane electrode assemblies formed on tho major surface of the base portion wherein each of the plurality of fuel cell membrane electrode assemblies is spaced at least 1 mm from an adjacent fuel cell membrane electrode assembly.

4. A fuel cell device as claimed in claim 1 wherein the fuel cell membrane electrode assembly further includes a carbon cloth backing positioned on the first electrode on a side opposite the adjacent film, and a carbon cloth backing positioned on the second electrode on a side opposite the adjacent film.

5. A fuel cell device as claimed in claim 4 where in the plurality of hydrophilic threads are positioned on an uppermost surface of the second electrode, characterized as sandwiched between the second electrode and the carbon cloth backing, the plurality of hydrophilic threads spaced apart and parallel to one another.

6. A fuel cell device as claimed in claim 1 wherein the first and second electrodes comprise a material selected from the group consisting of platinum, palladium, gold, nickel, tungsten carbide, ruthenium, molybdenum, and alloys of platinum, palladium, gold, nickel, tungsten carbide, molybdenum, and ruthenium.

7. A fuel cell device as claimed in claim 4 wherein the film overlying the first electrode comprises a proton exchange material.

8. A fuel cell device comprising:
    a base portion, formed of a singular body, and having a major surface, the base portion formed or a material selected from the group consisting of ceramic, plastic, glass, and silicon;
    at least one fuel cell membrane electrode assembly formed on the major surface of the base portion, the at least one fuel cell membrane electrode assembly including a first electrode, a film formed of a protonically conductive electrolyte, a second electrode, and a plurality of hydrophilic threads positioned to absorb reaction water at the second electrode;
    a fluid supply channel defined in the base portion and communicating with the at least one fuel cell membrane electrode assembly for supplying a fuel-bearing fluid to the at least one fuel cell membrane electrode assembly, the fluid supply channel further including a first fuel-bearing fluid inlet, and a second fuel-bearing fluid inlet, and a mixing chamber;
    an exhaust channel defined in the base portion and communicating with the at least one fuel cell membrane electrode assembly, the exhaust channel spaced apart from the fluid supply channel for exhausting fluid from the at least one spaced apart fuel cell membrane electrode assembly, the exhaust channel further including a water recovery and recirculation channel in fluidic communication with the at least one fuel cell membrane electrode assembly, and the plurality of hydrophilic threads, wherein the water recovery and recirculation channel provides for the recovery and recirculation from the fuel cell back to the mixing chamber, a spent water and ethanol mixture and reaction water collected from the plurality of hydrophilic threads, in combination the at least one fuel cell membrane electrode assembly and the cooperating fluid supply channel and cooperating exhaust channel forming a single fuel cell assembly; and
    a top portion including a plurality of electrical components for electrical integration of the plurality of formed fuel cell assemblies.

9. A fuel cell device as claimed in claim 8 further including a plurality of spaced apart fuel cell membrane electrode assemblies formed on the major surface of the base portion, thereby forming a plurality of fuel cell assemblies.

10. A fuel cell device as claimed in claim 9 wherein the plurality of fuel membrane electrode assemblies are electrically connected in one of a series electrical interface or a parallel electrical interface.

11. A fuel cell device as claimed in claim 10 wherein the fluid supply channel defined in the base portion and the exhaust channel defined in the base portion are formed to equally and simultaneously communicate with each of the plurality of spaced apart fuel cell membrane electrode assemblies.

12. A fuel cell device as claimed in claim 11 wherein the first and second electrodes comprise a material selected from the group consisting of platinum, palladium, gold, nickel, tungsten carbide, molybdenum, ruthenium, and alloys of platinum, palladium, gold, nickel, tungsten carbide, molybdenum, and ruthenium.

13. A fuel cell device as claimed in claim 11 wherein the plurality of spaced apart fuel cell membrane electrode assemblies each further include a carbon backing cloth positioned adjacent to the first and second electrodes.

14. A fuel cell device as claimed in claim 13 wherein the plurality of hydrophilic threads are positioned spaced apart on one of the surface of the second electrode or the surface of the carbon backing adjacent the second electrode.

15. A fuel cell device as claimed in claim 8 wherein the plurality of hydrophilic threads are formed of a polyester material.

16. A method of fabricating a fuel cell device comprising the steps of:

providing a base portion formed of a material selected from the group consisting of ceramic, plastic, glass, and silicon;

forming a fluid supply channel in the base portion for supplying a fuel-bearing fluid to at least one fuel cell membrane electrode assembly, the fluid supply channel further including a mixing chamber and a methanol concentration sensor;

forming an exhaust channel in the base portion, the exhaust channel spaced apart from the fluid supply channel for exhausting fluid from the at least one spaced apart fuel cell membrane electrode assembly, the exhaust channel further including a water recovery and recirculation channel for the recovery and recirculation of a spent fuel-bearing fluid and a reaction water;

forming the at least one fuel cell membrane electrode assembly on the major surface of the base portion, the step of forming the at least one spaced apart fuel cell membrane electrode assembly including the steps of providing for a first electrode on a major surface of the base portion, providing for a film formed of a protonically conductive electrolyte in contact with the first electrode, providing for a second electrode in contact with the film, and providing for a plurality of hydrophilic threads positioned to absorb reaction water at the second electrode, thereby providing for the recovery and recirculation from the fuel cell back to the mixing chamber, the spent fuel-bearing fluid and reaction water collected from the plurality of hydrophilic threads, the at least one spaced apart fuel cell membrane electrode assembly and the cooperating fluid supply channel and cooperating exhaust channel forming a single fuel cell assembly; and forming a top portion including a plurality of electrical components for electrical integration of the formed fuel cell assembly.

17. A method of fabricating a fuel cell device as claimed in claim 16 wherein the step of forming the at least one fuel cell membrane electrode assembly on the major surface of the base portion includes the step of forming a plurality of fuel cell membrane electrode assemblies.

18. A method of fabricating a fuel cell device as claimed in claim 16 wherein the step of electrically interfacing the plurality of fuel cell assemblies includes one of the steps of electrically connecting each of the second electrodes to an adjacent first electrode, thus connecting the plurality of fuel cells in series electrically to increase the output voltage of the structure or electrically connecting each of the first electrodes to an adjacent first electrode and connecting each of the second electrodes to an adjacent second electrode, thus connected in parallel electrically to increase the output current.

\* \* \* \* \*